United States Patent
Dallmer-Zerbe et al.

(10) Patent No.: US 12,431,818 B2
(45) Date of Patent: Sep. 30, 2025

(54) POWER CONVERTER AND METHOD FOR OPERATING A POWER CONVERTER

(71) Applicant: Siemens Energy Global GmbH & Co. KG, Munich (DE)

(72) Inventors: Kilian Dallmer-Zerbe, Bubenreuth (DE); Diego Alberto Roman Marcos, Erlangen (DE); Rodrigo Alonso Alvarez Valenzuela, Nuremberg (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 211 days.

(21) Appl. No.: 17/902,071

(22) Filed: Sep. 2, 2022

(65) Prior Publication Data

US 2023/0062617 A1     Mar. 2, 2023

(30) Foreign Application Priority Data

Sep. 2, 2021   (EP) .................................... 21194536

(51) Int. Cl.
  *H02M 1/00*   (2007.01)
  *H02M 1/08*   (2006.01)
  (Continued)

(52) U.S. Cl.
  CPC ......... *H02M 7/219* (2013.01); *H02M 1/0012* (2021.05); *H02M 1/08* (2013.01); *H02M 7/4835* (2021.05)

(58) Field of Classification Search
  CPC ...... H02M 1/0012; H02M 1/08; H02M 7/219; H02M 7/483; H02M 7/4833; H02M 7/4835
  See application file for complete search history.

(56) References Cited

U.S. PATENT DOCUMENTS

| 11,277,076 B2 | 3/2022 | Dallmer-Zerbe et al. |
| 2014/0003101 A1* | 1/2014 | Tang .................... H02M 7/4835 363/40 |

(Continued)

FOREIGN PATENT DOCUMENTS

| CN | 106787880 A | 5/2017 |
| CN | 107404247 A | 11/2017 |

(Continued)

OTHER PUBLICATIONS

Yaramasu et al., Modulated Predictive Voltage Control of a Four-Leg Inverter with Fixed Switching Frequency, 2020 11th Power Electronics, Drive Systems, and Technologies Conference (PEDSTC), pp. 1-6, pub. IEEE, Feb. 4, 2020, Tehran, Iran. (Year : 2020).*

(Continued)

*Primary Examiner* — Thienvu V Tran
*Assistant Examiner* — Shahzeb K Ahmad
(74) *Attorney, Agent, or Firm* — Laurence A. Greenberg; Werner H. Stemer; Ralph E. Locher

(57) ABSTRACT

A power converter has at least one series circuit of switching modules that each have semiconductor switches and an energy storage unit. A method of operating the power converter includes a step of making a prediction for at least one voltage value of the power converter and carrying out switching operations on the switching modules based on the prediction in order to regulate a switching frequency. There is also described a power converter that is configured to carry out a method according to the invention.

9 Claims, 2 Drawing Sheets

(51) Int. Cl.
  *H02M 7/21* (2006.01)
  *H02M 7/219* (2006.01)
  *H02M 7/483* (2007.01)

(56) References Cited

U.S. PATENT DOCUMENTS

2015/0171769 A1* 6/2015 Geyer .................. H02M 7/483
                                                    363/71
2017/0123014 A1* 5/2017 Goetz .................... G01R 31/40

FOREIGN PATENT DOCUMENTS

EP        3713073 A1    9/2020
WO   WO-2021038246 A1 * 3/2021  ............ H02M 7/483

OTHER PUBLICATIONS

Venkata Yaramasu; Alexander Dahlmann; Apparao Dekka; Marco Rivera; Tomislav Dragicevic; Jose Rodriguez; "Modulated Predictive Voltage Control of a Four-Leg Inverter with Fixed Switching Frequency"; May 7, 2020; IEEE; pp. 1-6 (Year: 2020).*

Fard Razieh, Nejati et al: "Analysis of a Modular Multilevel Inverter Under the Predicted Current Control Based on Finite-Control-Set Strategy", 2013 3rd International Conference On Electric Power and Energy Conversion Systems, IEEE; Oct. 2, 2013 (Oct. 2, 2013), pp. 1-6, XP032550893;.

Apparao, Dekka et al: "Indirect Control of Capacitor Voltage Ripple and Circulating Current in a Modular Multilevel Converter"; IECON 2018—44th Annual Conference of the IEEE Industrial Electronics Society, IEEE, Oct. 21, 2018 (Oct. 21, 2018), pp. 3955-3960, XP033486106;.

Apparao, Dekka et al: "An Improved Indirect Model Predictive Control Approach for Modular Multilevel Converter"; IECON 2016—42nd Annual Conference of the IEEE Industrial Electronics Society, IEEE; Oct. 23, 2016 (Oct. 23, 2016), pp. 5959-5964, XP033033283;.

Chan et al., Simple Algorithm with Fast Dynamics for Cascaded H-bridge Multilevel Inverter based on Model Predictive Control Method, 2017 IEEE Applied Power Electronics Conference and Exposition (APEC), pp. 696-702, pub. IEEE, Mar. 26, 2017, Tampa, USA.

Biffie et al., Analysis of Control Strategies In Transformerless Dynamic Voltage Restorer, 2017 International Conference on Innovative Research In Electrical Sciences (IICIRES), pp. 1-7, pub. IEEE, Jun. 16, 2017, Nagapattinam, India.

Yaramasu et al., Modulated Predictive Voltage Control of a Four-Leg Inverter with Fixed Switching Frequency, 2020 11th Power Electronics, Drive Systems, and Technologies Conference (PEDSTC), pp. 1-6, pub. IEEE, Feb. 4, 2020, Tehran, Iran.

* cited by examiner

POWER CONVERTER AND METHOD FOR OPERATING A POWER CONVERTER

CROSS-REFERENCE TO RELATED APPLICATION

This application claims the priority, under 35 U.S.C. § 119, of European Patent Application EP 21194536.5, filed Sep. 2, 2021; the prior application is herewith incorporated by reference in its entirety.

FIELD AND BACKGROUND OF THE INVENTION

The invention relates to a method for operating a power converter having at least one series circuit of switching modules that each have semiconductor switches and an energy storage unit.

A method of this type is known, for example, from the commonly assigned U.S. Pat. No. 11,277,076 B2 and its European counterpart patent application EP 3 713 073 A1. There, a switching frequency regulator is used to adjust the switching frequency and therefore the switching losses for each operating point. To this end, an error integral between the voltage currently set and the setpoint voltage is calculated in order to trigger a switching operation when an integral limit value is exceeded or undershot. In particular, if the upper integral limit value is exceeded, at least one deactivated switching module is activated or in the case of switching modules able to be switched in a bipolar manner (such as full-bridge switching modules), a negatively switched-on switching module is deactivated (switched off). In contrast, if the lower integral limit value is fallen below, at least one activated switching module is deactivated (in the case of full-bridge switching modules, it is possible to activate a switching module with negative polarity). The two integral limit values or the difference between them therefore define/defines a permissible voltage deviation range. The greater the voltage deviation range, the lower the resulting (average) switching frequency. A reduction in the integral limit value results in an increase in the switching frequency, correspondingly an increase in the integral limit value results in a reduction of the switching frequency. The known method is usually referred to as tolerance-based modulation (TBM).

A further known approach for modulating the voltage in a power converter is so-called nearest level modulation (NLM). This allows the switching frequency to be greatly reduced. However, typical NLM approaches lead to poorer values of so-called total harmonic distortion (THD).

It is known that losses occur during the operation of power converters that above all depend on on-state losses and the mentioned switching losses of the switching modules used. In applications in the transmission grid, these losses lead to an increase in operating costs. At the same time, an optimum operating power with respect to the harmonics and the distortion is required, meaning that it is necessary to strike a balance between the total harmonic distortion and the losses during operation of the power converter. The switching losses already mentioned cannot be reduced as desired without increasing a voltage imbalance between the switching modules of a power converter arm. A low switching frequency, in particular, causes individual switching modules to sometimes remain in the current path for longer, with the imbalance increasing. In the event of a fault, this imbalance leads to a potentially lower energy consumption capacity of the switching modules (before the protective limits thereof are reached). In the design, this usually causes a disadvantageous (i.e., in terms of production costs and operating costs) increase in the number of installed switching modules. Additionally, the imbalance can sometimes reduce the service life of the switching modules and therefore of the entire power converter.

SUMMARY OF THE INVENTION

It is accordingly an object of the invention to provide a method and a power converter which overcome the above-mentioned disadvantages of the heretofore-known devices and methods of this general type and which provides for a method of the generic type that allows the operation of the power converter that is as cost-effective and reliable as possible.

With the above and other objects in view there is provided, in accordance with the invention, a method for operating a power converter, the power converter having at least one series circuit of switching modules each with semiconductor switches and an energy storage unit, the method which comprises:
  making a prediction for at least one voltage value of the power converter; and
  carrying out switching operations on the switching modules based on the prediction in order to control (closed-loop control) a switching frequency.

The switching operations on the switching modules can be implemented or carried out by switching the semiconductor switches of the switching modules. By way of example, the energy storage unit of the respective switching module can be inserted into the current path of the series circuit or can be removed from the current path of the series circuit by means of a switching operation on one of the switching modules. Suitably, to this end, the switching modules comprise semiconductor switches that can be deactivated, such as IGBTs, IGCTs or the like, for example.

According to the invention, the switching operations are at least also carried out on the basis of a prediction regarding voltage values to be expected in the future. Therefore, when choosing the switching operations, it can advantageously be taken into account which switching operations support the future development of the voltage value and which run counter to this. The effectiveness of the switching frequency regulation can be increased in this way. In particular, the switching frequency and the losses associated therewith can be reduced without the THD value being increased at the same time.

According to one embodiment of the invention, the voltage value is a setpoint voltage value for an arm voltage of the power converter. The power converter can comprise one or more power converter arms that each have a series circuit of the switching modules. The arm voltage is the voltage present at the power converter arm or at the associated series circuit. According to this variant, switching operations are carried out taking into account the expected setpoint voltage for the respective power converter arm.

The prediction is preferably made on the basis of at least two previous voltage values of the arm voltage. Taking two voltage values into account allows a simple linear extrapolation, for example, with the result that it is possible to predict or estimate a subsequent future voltage value. Taking a higher number of past voltage values into account makes a more accurate prediction possible (for example a nonlinear extrapolation).

The prediction expediently comprises calculating the discrete time derivative of the previous voltage values. In the simplest case, calculating the derivative dU/dt can consist of determining the difference between two past voltage values (preferably the last two), DeltaU=U(t2)−U(t1), which is divided by the time interval between them, dU/dt=DeltaU/(t2−t1). There are also other methods that are conceivable, however, for example modeling a function of a temporal profile of the past voltage values, wherein a derivative of this function is used for the prediction.

In some applications, it is not necessary for a predicted voltage value (for example a subsequent future expected voltage value) to be provided as the result of the prediction. It can rather be sufficient to determine a trend of the future temporal profile of the voltage values. Suitably, change information about whether an expected (according to the prediction) subsequent future voltage value is higher or lower than the currently valid voltage value is provided as a result of the prediction.

If the trend is known, a switching operation that causes a change in the arm voltage that is contrary to the change information can therefore be prevented. There are switching operations that cause the arm voltage to increase. By way of example, inserting a positively charged energy storage unit into the current path of the power converter arm can increase the arm voltage. Furthermore, there are switching operations that cause the arm voltage to decrease. By way of example, bypassing an energy storage unit can reduce the arm voltage. If, on account of the change information, it is expected that the voltage value, for example the setpoint voltage value, will increase in the future, switching operations that would cause the arm voltage of the associated power converter arm to decrease are therefore prevented. If, on account of the change information, it is expected that the voltage value, for example the setpoint voltage value, will decrease in the future, switching operations that would cause the arm voltage of the associated power converter arm to increase are therefore prevented. By way of example, the prevention can be implemented by means of a superordinate regulation query. The regulation query is accordingly preceded by a regulation function that ascertains or determines switching operations that are next to be implemented in the course of switching frequency regulation.

According to one embodiment of the invention, an expected subsequent future voltage value is provided as a result of the prediction. The switching operation is only prevented if an absolute difference between the (expected) subsequent future voltage value and the currently valid voltage value is greater than a predetermined threshold (a predetermined threshold value). Predictions that are not explicit enough can be filtered out. Using the threshold value can advantageously mean that switching operations are not prevented in those cases in which the prediction is not reliable enough. An example of this would be, for instance, maintaining a voltage plateau in which setpoint voltage values are virtually constant and it is not possible to utilize change information in some circumstances.

The term "regulate," as used herein, is synonymous with "closed-loop-control" or a hybrid of closed-loop and open-loop control. The terms regulator or regulating device are also partly replaceable by the terms controller or controlling.

Regulating the switching frequency preferably comprises the tolerance-based modulation already described. The switching frequency regulation can in particular include regulation of an average switching frequency of one of the power converter arms. An upper and a lower integral limit value can be determined as follows, for example. First, a voltage deviation is calculated as the difference between a setpoint voltage value and an ascertained actual voltage value. The actual voltage value is preferably a sum of the measured energy storage unit voltages of the switching modules, that is to say the voltages, which are present at the respective energy storage unit of the switching modules, of all the activated switching modules in the power converter arm in question. The voltage deviation is then integrated discretely over time. The upper integral limit value defines the maximum permissible value of the integral, the lower integral limit value defines the minimum permissible value of the integral.

In accordance with one embodiment of the invention, the voltage value is an arm voltage of a power converter arm. A setpoint voltage value for the arm voltage is determined taking the prediction into account. A prediction of the charging or discharging of the power converter (or at least one of its power converter arms) is accordingly carried out during the computing cycle of the regulation system. The extent to which the voltage of the power converter arm is expected to change during the computing cycle of the regulation system is determined from the present switching states and a prediction of the arm current. The regulation of the setpoint voltage value now takes this information into account instead of the measured value of the arm voltage. Switching operations that are superfluous as a result of inherent charging or discharging during the computing cycle can be avoided.

As a further variant, it is also conceivable for the voltage value to be an energy storage unit voltage present at the energy storage unit of the switching module.

The invention relates to a power converter having at least one series circuit of switching modules that each have semiconductor switches and an energy storage unit.

A power converter of this type is known from the above-noted U.S. Pat. No. 11,277,076 B2 and EP 3 713 073 A1. The power converter can comprise power converter arms that are each connected between a DC pole and an AC connection or else between two AC connections. The series circuit of switching modules is arranged in one of the power converter arms. The power converter can be configured to convert a DC voltage into an AC voltage (and vice versa). The power converter can also be designed for frequency conversion or else for the stabilization of an AC voltage grid, however. The power converter usually comprises a regulating device. Regulation parameters of the power converter can be regulated by means of the regulating device. Regulation parameters can be a voltage, a current or a power, for example. In particular, an arm voltage can be regulated, that is to say the voltage present at one of the power converter arms. A power converter of the type is often referred to as a modular multilevel converter.

The object of the invention is to specify a power converter of the generic type that is as cost-effective and reliable as possible during operation.

With the above and other objects in view there is provided, in accordance with the invention, a power converter of the generic type with a control device that is designed to carry out a method according to the invention.

The advantages of the power converter according to the invention emerge in particular from the advantages that have already been described in connection with the method according to the invention.

Other features which are considered as characteristic for the invention are set forth in the appended claims.

Although the invention is illustrated and described herein as embodied in a power converter and method for operating a power converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
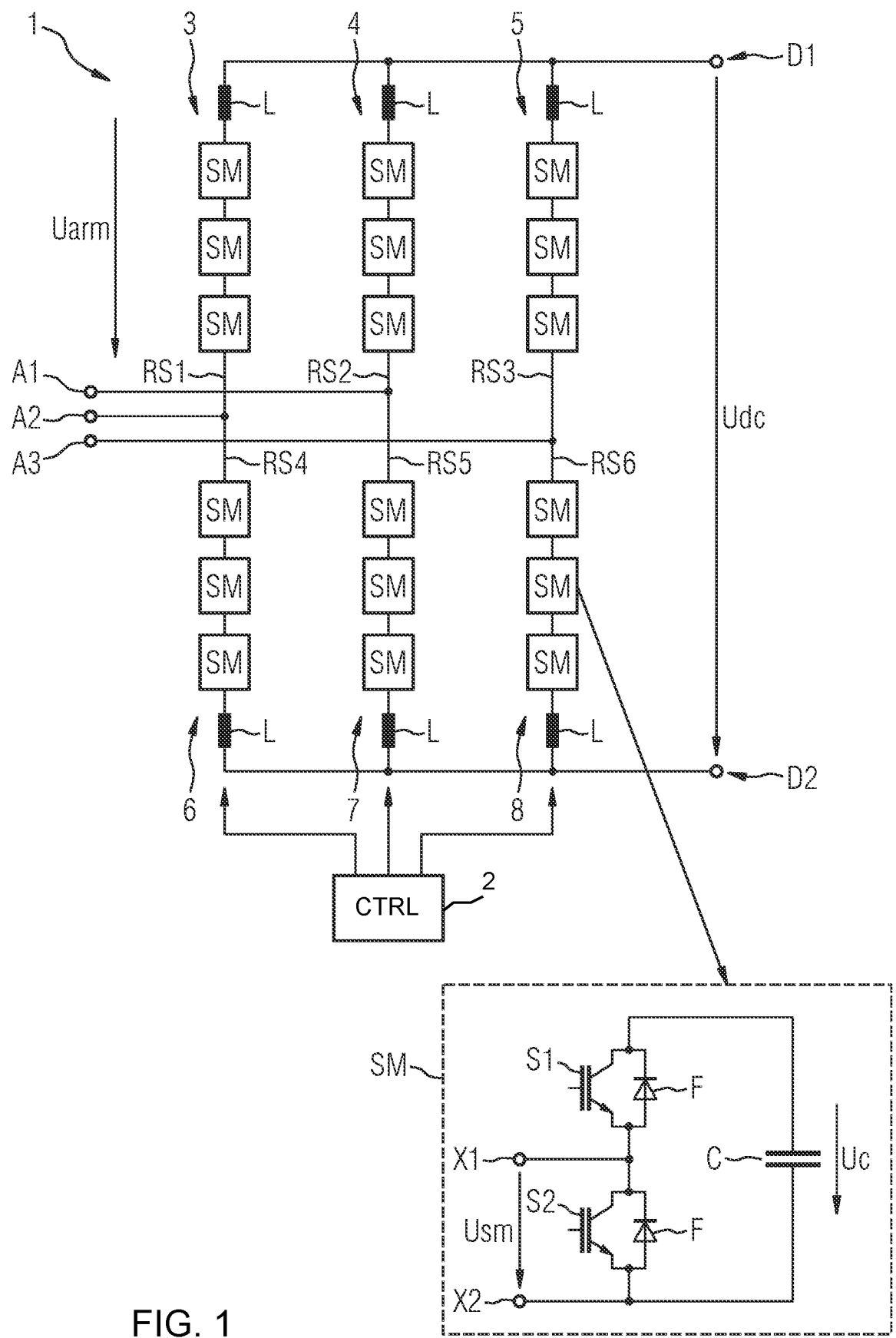
FIG. 1 is a schematic illustration of an exemplary embodiment of a power converter according to the invention.

Referring now to the figures of the drawing in detail and first, in particular, to FIG. 1 thereof, there is shown a power converter 1 which may also be referred to as a modular multilevel converter (MMC). The power converter 1 comprises six power converter arms 3-8 having series circuits RS1-RS6 that each comprise a plurality of switching modules SM and having an inductance L (arm inductor). In the example illustrated, the MMC is designed to convert an AC voltage of an AC voltage grid, to which the MMC can be connected for example by way of connections A1-A3 and of a grid transformer, into a DC voltage UDC (or vice versa). The power converter 1 can be connected to a DC voltage grid or a DC voltage line by way of the connections D1, D2. The power converter 1 also comprises a regulating device 2, or controller 2, that is designed for power converter control. In this case, current, voltage, power and frequency can be regulated by means of the regulating device 2. By way of example, an arm voltage Uarm can be regulated by means of the regulating device 2. The arm voltage Uarm indicates the voltage present at the first power converter arm 3.

In the example illustrated in FIG. 1, all the switching modules SM are of identical design. In principle, however, it is also conceivable for switching modules of different designs to be used in one and the same power converter, for example half-bridge switching modules and full-bridge switching modules. The switching module SM comprises a capacitor branch in which there is arranged a first semiconductor switch S1 with an antiparallel freewheeling diode F and, in series therewith, an energy storage unit C. A second semiconductor switch S2 is arranged with an antiparallel freewheeling diode F in a bridge branch between two connections X1, X2 of the switching module SM. A switching module voltage Usm that corresponds to the capacitor voltage Uc or else a zero voltage can be producible at the connections X1, X2 by way of suitable actuation of the two semiconductor switches S1, S2.

Figure 2:
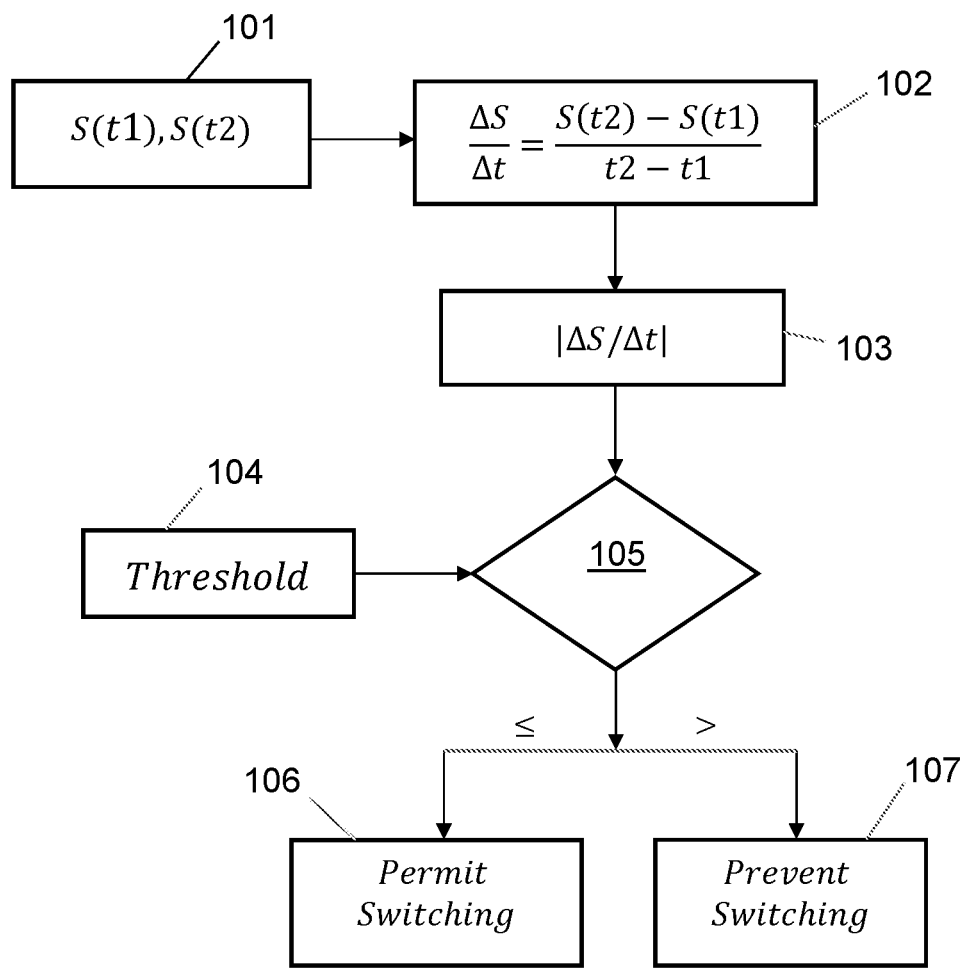
FIG. 2 is a schematic flowchart of an exemplary embodiment of a method according to the invention.

FIG. 2 illustrates a flow chart 100 for a method for operating a power converter, such as the power converter 1 in FIG. 1, for example. In a first method step 101, two past or previous setpoint voltage values S(t1) and S(t2) are provided for an arm voltage of a power converter arm. Each of the past setpoint voltage values is assigned a past time t1 or t2, wherein t1<t2. For predicting future setpoint voltage values, the following procedure is adopted. In a second method step 102, a discrete derivative DeltaS/Deltat is calculated: DeltaS/Deltat=(S(t2)−S(t1))/(t2−t1). In a third method step 103, the absolute value |DeltaS/Deltat| and change information are stored and provided, wherein the change information indicates whether DeltaS/Deltat>0, DeltaS/Deltat<0 or DeltaS/Deltat=0.

In a fourth method step 104, a predetermined, defined threshold or a predetermined threshold value is provided. In a fifth method step 105, the threshold is tested against the absolute value from step 103, i.e., a check is performed to determine whether the absolute value is greater than the predetermined threshold value. If the absolute value is below the threshold (or does not exceed the threshold), according to a sixth method step 106, all of the future switching operations ascertained or determined by the remaining switching frequency regulation are permitted. If the absolute value is above the threshold, according to a seventh method step 107, those switching operations determined by the remaining switching frequency regulation that would cause a change in the arm voltage that is contrary to the change information are prevented.

If, for example according to the change information, it holds true that DeltaS/Deltat>0 (ΔS/Δt>0), then it is assumed that a subsequent future setpoint voltage value increases relative to the last valid setpoint voltage value. Accordingly, those switching operations that cause the arm voltage to reduce are prevented (or stopped using closed-loop control technology) within a predetermined period of time.

The invention claimed is:

1. A method for operating a power converter, the power converter having at least one series circuit of switching modules each with semiconductor switches and an energy storage unit, the method which comprises: making a prediction for at least one voltage value of the power converter by calculating a discrete time derivative of at least two past voltage values of an arm voltage of the power converter; and carrying out switching operations on the switching modules based on the prediction in order to control a switching frequency; wherein the at least two past voltage values of the arm voltage of the power converter include two past voltage values of the arm voltage of the power converter; and wherein the discrete time derivative of the two past voltage values of the arm voltage of the power converter is calculated by determining a difference between the two past voltage values divided by a time interval between the two past voltage values, or the discrete time derivative of the two past voltage values of the arm voltage of the power converter is calculated by modeling a function of a temporal profile of the two past voltage values.

2. The method according to claim 1, wherein the at least one voltage value is a setpoint voltage value for an arm voltage of the power converter.

3. The method according to claim 1, which comprises making the prediction on a basis of at least two past voltage values of an arm voltage of the power converter.

4. The method according to claim 1, which comprises making the prediction by generating change information about whether an expected subsequent future voltage value is higher or lower than a currently valid voltage value.

5. The method according to claim 4, which comprises preventing a switching operation that causes a change in the arm voltage that is contrary to the change information.

6. The method according to claim 5, which comprises preventing the switching operation only if an absolute difference between the subsequent future voltage value and the currently valid voltage value is greater than a predetermined threshold.

7. The method according to claim 1, wherein the step of controlling the switching frequency comprises a tolerance-based modulation.

8. The method according to claim 1, wherein the voltage value is an arm voltage of a power converter arm of the power converter and the method comprises determining a setpoint voltage value for the arm voltage taking the prediction into account.

9. A power converter, comprising: at least one series circuit of switching modules each having semiconductor switches and an energy storage unit; and a regulating device configured to carry out a method for operating the power converter, the method which comprises: making a prediction for at least one voltage value of the power converter by calculating a discrete time derivative of at least two past voltage values of an arm voltage of the power converter; and carrying out switching operations on the switching modules based on the prediction in order to control a switching frequency; wherein the at least two past voltage values of the arm voltage of the power converter include two past voltage values of the arm voltage of the power converter; and wherein the discrete time derivative of the two past voltage values of the arm voltage of the power converter is calculated by determining a difference between the two past voltage values divided by a time interval between the two past voltage values, or the discrete time derivative of the two past voltage values of the arm voltage of the power converter is calculated by modeling a function of a temporal profile of the two past voltage values.

* * * * *